United States Patent Office 2,742,396
Patented Apr. 17, 1956

2,742,396

OINTMENT BASE

Glen J. Sperandio, West Lafayette, Ind., and John B. Ward, Roselle Park, N. J., assignors to Purdue Research Foundation No Drawing. Application August 13, 1952,
Serial No. 304,216

4 Claims. (Cl. 167—63)

This invention relates to pharmaceutical extending media and more particularly to dry powder mixtures which are convertible to hydrophilic ointment bases by the addition of water.

The preparation of hydrophilic ointment bases, that is, bases which are soluble in water or which incorporate water as one of their major ingredients, has been well known to the art since the introduction of surface-active agents. By the use of selected substances from this group of agents, there are obtained ointment bases which contain water and which can be removed from skin or clothing simply by washing with water. The advantages accruing from use of hydrophilic ointment bases in the preparation of pharmaceutical compositions have resulted in their widespread adoption and use.

The hydrophilic ointment bases hitherto provided for pharmaceutical extending media possess certain inherent disadvantages. Thus, since the bases of the prior art are emulsions, they exhibit all of the disadvantages and incompatibilities of emulsions. Thus, for example, they have a tendency to separate into their aqueous and oleaginous components when subjected to extremes of temperature, and once they have thus separated, they cannot always be reconstituted as ointments. Even heating and mixing in the same manner as during their preparation often fails to accomplish a reemulsification for in the preparation of the ointment bases heretofore known it is necessary to incorporate the ingredients seriatim. Furthermore, the hydrophilic ointment bases heretofore employed have been prepared by emulsifying a liquid phase and an oleaginous phase, using a suitable surface-active agent, with the aid of heat. Compositions prepared in this way are not well adapted to the incorporation therein of heat labile therapeutic substances, such as penicillin and the like, since the application of heat during their preparation tends to destroy the sensitive therapeutic ingredients.

It is an object of this invention to prepare a powdered pharmaceutical extending medium which by the addition of water alone and without the use of heat is converted into a hydrophilic ointment base. It is another object of this invention to provide a composition which can be converted to a hydrophilic ointment base whose consistency can be closely controlled by regulating its water content. It is a further object of this invention to provide a stable hydrophilic suspensoid ointment base which does not readily separate into its components under storage at extremes of temperature and which is compatible with a wide variety of medicaments. Other objects will be disclosed hereinafter.

We have found that a mixture of a polyethylene glycol, stearic acid, a salt of stearic acid, cholesterol, and a dispersing or surface-active agent can be prepared in the form of a powder. Said mixture, when mixed with water, provides a stable hydrophilic ointment base without the application of heat which heretofore has always been required for the preparation of ointment bases. The ointment base produced thereby is a suspension rather than an emulsion and is stable over a wide range of temperatures. A large percentage of oil may be incorporated into the ointment thus prepared without impairing the stability or washability thereof. Furthermore, the consistency of the base can be altered merely by changing the quantity of water added thereto. Thus, if desired, proportionately greater amounts of water may be added to the powdered mixture, whereby there can be produced a soft ointment or even a lotion having desirable properties of smoothness and ready washability.

The new powdered extending media include the following preferred proportions of ingredients:

| | Parts |
|---|---|
| High molecular weight polyethylene glycol | 20–25 |
| Sodium stearate | 20–50 |
| Stearic acid | 20–50 |
| Cholesterol | 1–1.25 |
| Dispersing agent | 4–5 |

The individual components prior to mixing preferably are powdered by grinding separately or otherwise comminuting them so they will pass a sieve of 40 mesh or smaller openings. For maximum smoothness of the ointment after addition of water the powders preferably are passed through an 80 mesh sieve. Thereafter, the powdered ingredients are thoroughly mixed to render the compositions substantially homogeneous.

The polyethylene glycols employed in the preparation of the compositions of this invention are those polyethylene glycols having molecular weights in excess of about 4,000. Polyethylene glycols having somewhat lower molecular weights are relatively soft waxy substances which do not readily lend themselves to incorporation in powdery mixtures. The polyethylene glycols most suitable for this invention are those sold under the trademark "Carbowax," and include "Carbowax" 4,000, 6,000 and the like.

The dispersing agent which is used is any water-compatible pharmaceutically compatible dispersing agent, such as a solid surface-active agent of the anionic type, e. g. sodium lauryl sulfate, dioctyl sodium sulfosuccinate, or the like; or a solid surface-active agent of the non-ionic type, e. g. sorbitan monostearate or sorbitan tristearate and the like. If desired, solid preservatives such as sodium ethylmercurithiosalicylate, alkyl-p-hydroxybenzoates (commercially available under the trademark "Parabens") and the like may be used. Such preservative substances can be used in amounts up to about 1 percent, although the lesser amounts effective to prevent the growth of molds and bacteria are preferred.

After the solid substances are powdered and thoroughly mixed, the resulting preparation can be kept indefinitely without deterioration. When it is desired to use the powdered mixture for the preparation of an ointment, the proper amount of the therapeutic ingredient whether solid or liquid is intimately mixed with the powdered extending medium. Thereafter, a quantity of water, depending in amount upon the consistency of the ointment base desired, is added to the powder, and stirred. A smooth ointment base suitable for immediate use is obtained. The base can be placed in jars, collapsible tubes or the like for later dispensing, if immediate application is not required. If the therapeutic substance is water-soluble, it can be incorporated into the water added to the dry powdered extending medium, to form the ointment base.

The following examples illustrate the preparation of the compositions of our invention, and the method of their use.

EXAMPLE 1

The following ingredients are separately ground to pass through an 80 mesh sieve and are then thoroughly mixed together:

| | Gram |
|---|---|
| "Carbowax" 4000 | 236 |
| Sodium stearate | 236 |
| Stearic acid | 468 |
| Cholesterol | 11.8 |
| Sodium lauryl sulfate | 47.2 |

The powdered mixture is readily converted to a hydrophilic ointment base by the addition of water. The following table illustrates the types of ointment base which which can be obtained by the addition of varying amounts of water to the powdered pharmaceutical extending medium.

TABLE

| Powdered extending medium, parts by weight | Water, parts by weight | Product formed | pH |
|---|---|---|---|
| 7 | 3 | thick paste | 7.4 |
| 6 | 4 | normal ointment base | 7.45 |
| 5 | 5 | do | 7.55 |
| 4 | 6 | creamy ointment base | 7.67 |
| 3 | 7 | thin ointment base | 8.08 |
| 1 | 9 | thin lotion | 8.3 |

EXAMPLE 2

A composition which contains preservatives to prevent mold or bacterial growth when converted to an ointment base, is prepared as follows:

| | Gram |
|---|---|
| "Carbowax" 4000 | 236 |
| Sodium stearate | 236 |
| Stearic acid | 468 |
| Cholesterol | 11.8 |
| Sodium lauryl sulfate | 47 |
| "Methyl Paraben" | 0.45 |
| "Propyl Paraben" | 0.25 |

The ingredients are separately ground to pass through an 80 mesh sieve, and are thoroughly mixed until substantially homogeneous. The powdered mixture can be kept indefinitely in the dry state. When it is desired to prepare an ointment base, the composition is mixed with the proper amount of water to provide the consistency of the base which is required.

The washable ointment bases which are prepared by the addition of water to the extending media of this invention are compatible with substantially all therapeutic substances. Examples of formulations or ointments using the new powdered pharmaceutical extending media are as follows:

EXAMPLE 3

*10 percent boric acid ointment*

10 g. of powdered boric acid and 54 g. of the powdered extending medium prepared as described in Example 1 are thoroughly mixed, 36 cc. of water are added thereto and the aqueous mixture is triturated in a mortar until smooth.

EXAMPLE 4

*Sulfathiazole ointment 5 percent*

To 57 g. of the powdered mixture prepared according to Example 1 are added 5 g. of powdered sulfathiazole, with thorough mixing. To the mixture are added 38 cc. of water while triturating in a mortar. The resulting smooth, washable ointment can be filled into jars or collapsible tubes as desired for later dispensing.

EXAMPLE 5

*Cod-liver oil ointment 10 percent*

54 g. of powdered extending medium prepared as described in Example 2 are placed in a mortar, and 10 g. of cod-liver oil are added thereto. The oil and the powder are thoroughly mixed, and 36 cc. of water are added. The preparation is further mixed in the mortar until a smooth ointment is obtained.

EXAMPLE 6

*Benzyl benzoate ointment 25 percent*

To 60 g. of a powdered extending medium prepared according to the method of Example 2 are added 25 g. of liquid benzyl benzoate. The mixture is triturated in a mortar until homogeneous, and then 15 cc. of water are added thereto. The mixture is worked until smooth, and dispensed in the usual manner.

EXAMPLE 7

*Compound sulfur-tar ointment*

A mixture of 10 g. of precipitated sulfur, 5 g. of solution of coal tar and 54 g. of powdered extending medium prepared according to Example 2 is triturated in a mortar until thoroughly mixed. 31 cc. of water are added thereto, with further trituration, until a smooth ointment is obtained. The ointment is dispensed in the usual manner.

EXAMPLE 8

*Penicillin ointment—1000 units per g.*

One million units of crystalline penicillin sodium G. are dissolved in 40 cc. of sodium citrate solution, and this solution is added to 60 gm. of the powdered extending medium prepared according to Example 2 and is triturated in a mortar until a smooth ointment is obtained.

We claim:

1. A powdered mixture capable of forming a hydrophilic pharmaceutical extending medium upon the addition of water, comprising about 20 to about 25 parts of a polyethylene glycol having molecular weight of not less than about 4,000, about 20 to about 50 parts of sodium stearate, about 20 to about 50 parts of stearic acid, about 1 to about 1.25 parts of cholesterol and from about 4 to about 5 parts of a water-compatible pharmaceutically compatible dispersing agent.

2. A powdered pharmaceutical extending medium adapted to form a hydrophilic ointment base upon addition of water, comprising a powdered mixture of about 20 parts of a polyethylene glycol having molecular weight of not less than about 4,000, about 20 parts of sodium stearate, about 50 parts of stearic acid, about 1 part of cholesterol, and about 4 parts of a water-compatible pharmaceutically compatible dispersing agent.

3. A dry powdered pharmaceutical composition adapted to form an ointment upon the addition of about an equal weight of water, and a lotion upon the addition of about a ninefold weight of water, comprising essentially an intimate mixture of powdered ingredients ground to pass through an 80-mesh sieve and containing about 20 parts of polyethylene glycol 4,000, about 20 parts of sodium stearate, about 40 parts of stearic acid, about 4 parts of sodium lauryl sulfate, and about 1 part of cholesterol.

4. A dry powdered pharmaceutical composition the solid ingredients of which are ground to a powder which will pass through an 80-mesh sieve, and containing from about 20 to about 25 parts of polyethylene glycol 4,000, about 20 to about 50 parts of sodium stearate, about 20 to about 50 parts of stearic acid, about 1.0 to about 1.25 parts of cholesterol and about 4 to about 5 parts of sodium lauryl sulfate.

References Cited in the file of this patent

UNITED STATES PATENTS 1,500,276    Schneible    July 8, 1924

(Other references on following page)

UNITED STATES PATENTS

| | | |
|---|---|---|
| 1,813,109 | Banks | July 7, 1931 |
| 1,930,853 | Kollek | Oct. 17, 1933 |
| 2,484,637 | Mattocks | Oct. 11, 1949 |
| 2,540,253 | Gakenheimer | Feb. 6, 1951 |
| 2,584,166 | Stevenson | Feb. 5, 1952 |

OTHER REFERENCES

Huston: Can. Pharm. J., November 15, 1948, pp. 999–1000.

Johnston: J. A. P. A. Scient. Ed., January 1943, pp. 25–28.